S. T. BOTTENFIELD.
TIRE.
APPLICATION FILED MAR. 3, 1916.
1,235,421.
Patented July 31, 1917.
2 SHEETS—SHEET 1.
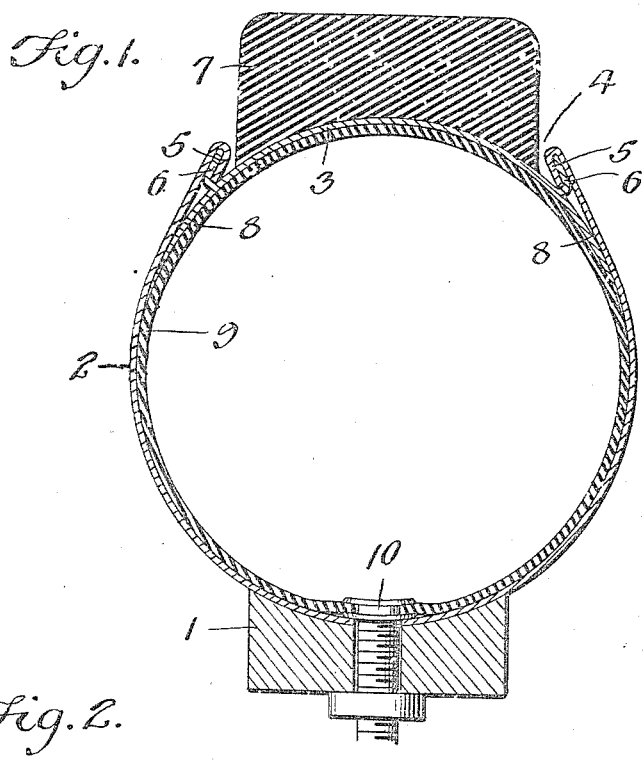
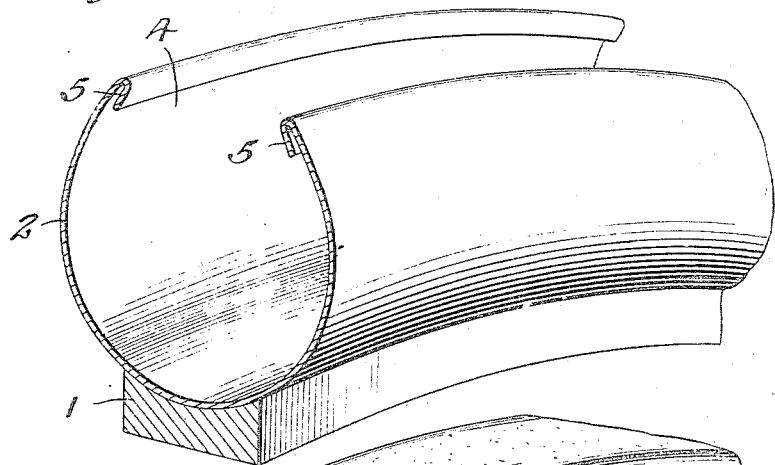
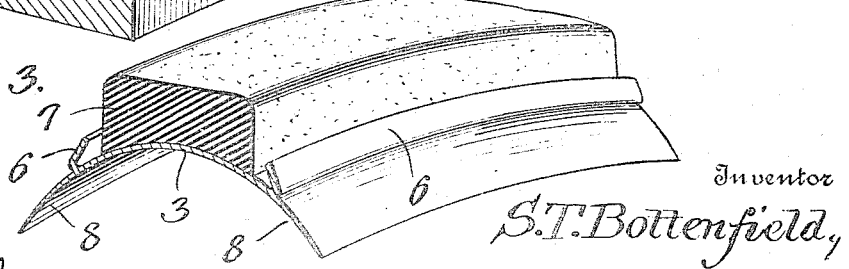
Witnesses
Inventor
S. T. Bottenfield,
By Victor J. Evans
Attorney

S. T. BOTTENFIELD.
TIRE.
APPLICATION FILED MAR. 3, 1916.

1,235,421.

Patented July 31, 1917.
2 SHEETS—SHEET 2.

Inventor
S. T. Bottenfield,
By Victor J. Evans
Attorney

Witnesses

UNITED STATES PATENT OFFICE.

SIDNEY T. BOTTENFIELD, OF CLEVELAND, OHIO, ASSIGNOR TO THE BOTTENFIELD TIRE COMPANY, OF CLEVELAND, OHIO, A CORPORATION OF OHIO.

TIRE.

1,235,421.

Specification of Letters Patent.

Patented July 31, 1917.

Application filed March 3, 1916. Serial No. 81,992.

*To all whom it may concern:*

Be it known that I, SIDNEY T. BOTTENFIELD, a citizen of the United States, residing at Cleveland, in the county of Cuyahoga and State of Ohio, have invented new and useful Improvements in Tires, of which the following is a specification.

This invention is an improved puncture-proof pneumatic tire, the object of the invention being to provide an improved tire of this kind embodying an aluminum or other metallic casing comprising rim and tread members which are detachably connected together and a pneumatic inner tire arranged within the casing so that the tire is puncture-proof and yet secures all the properties and resistance qualities of an ordinary rubber tire.

The invention consists in the construction, combination, and arrangement of devices, hereinafter described and claimed.

Figure 1 is a transverse sectional view of a tire constructed and arranged in accordance with my invention.

Fig. 2 is a perspective view of the rim member.

Fig. 3 is a similar view of the tread member.

Figure 4:
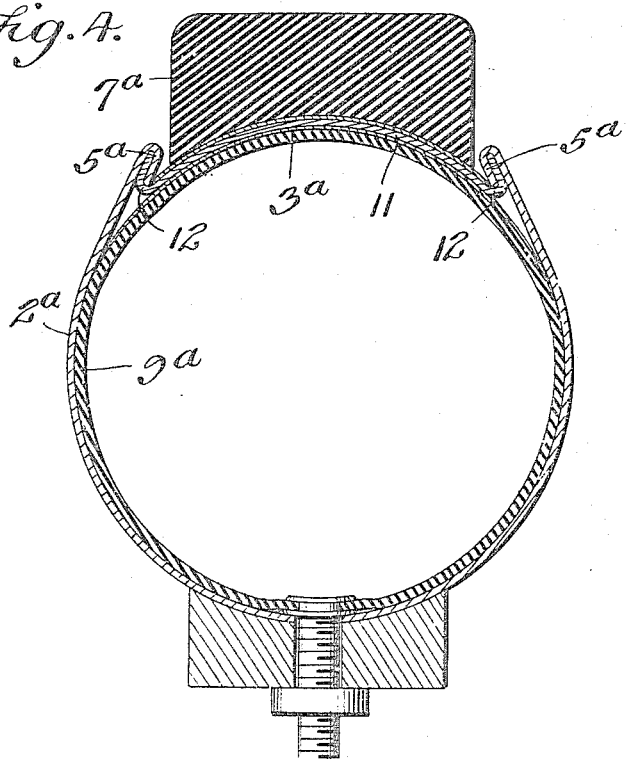
Fig. 4 is a transverse sectional view of a modified form of my improved tire.
Figure 5:
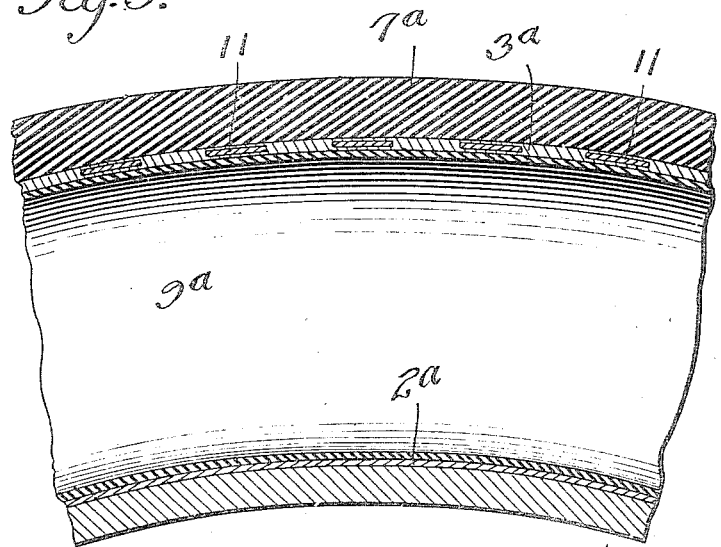
Fig. 5 is a detail longitudinal sectional view of the same.

Referring to the form of my invention shown in Figs. 1, 2, and 3, a wooden rim is indicated at 1. The casing of the tire comprises a rim member 2 which is secured on the periphery of the rim and a tread member 3 which is detachably secured to the rim member. Each member of the casing is made of aluminum or other suitable metal. The rim member 2 forms nearly a complete circle in cross section, is open at its outer side as at 4 and is provided at the edges of its side walls with clencher flanges 5. The tread member 3 is arranged to be fitted in and to project outwardly from the opening 4 of the rim member, and is provided with clencher flanges 6 to engage the clencher flanges 5 and thereby detachably secure the members 2, 3, together.

A tread 7 of rubber or other suitable material is secured on the outer side of the tread member and in practice is about an inch thick and is of suitable width. The tread member has side portions 8 which bear against the inner sides of the walls of the rim member. An inner pneumatic tire 9 is arranged in the casing and is supplied with compressed air through a valve 10 by usual construction. The aluminum or other metal of which the casing members are constructed renders the casing flexible so that it yields to shocks and then reassumes its normal shape and coacts with the inner pneumatic tire 9, to provide a tire, which while puncture proof, has all the properties and advantages of an ordinary rubber tire.

In the modified form of my invention, the rim member is indicated at $2^a$ provided with the clencher flanges $5^a$. The tread member $3^a$ is made of rubber and fabric and is provided with transversely arranged steel spring ribs 11, which in practice are about an inch apart and are provided at their ends with clencher flanges 12 for engagement with the clencher flanges $5^a$ of the rim member $2^a$ of the casing. The tread $7^a$ is similar to the tread in the form of the invention shown in Figs. 1, 2, and 3. An inner pneumatic tire $9^a$ is placed in the casing formed by the members $2^a$ and $3^a$ as shown.

Having described the invention, what is claimed is:

A tire comprising a rim member constructed to be substantially circular in cross section with its two edge portions inclined toward each other but spaced apart to form an annular slot, a clencher flange formed integral with each edge portion and lying parallel thereto, a metallic annular tread member closing said slot and having its edge portions bent into clencher flanges arranged at an angle to each other and the body of the member and having slidable locking engagement with said first mentioned flanges and a resilient tread element mounted upon said tread member and having parallel sides spaced from said flanges which lie at an angle to the sides.

In testimony whereof I affix my signature in presence of two witnesses.

SYDNEY T. BOTTENFIELD.

Witnesses:
H. Z. BLENKHOM,
JOHN L. BARSLEY.